United States Patent
Kekare

(10) Patent No.: US 8,549,445 B2
(45) Date of Patent: Oct. 1, 2013

(54) TARGETED PRODUCTION CONTROL USING MULTIVARIATE ANALYSIS OF DESIGN MARGINALITIES

(75) Inventor: Sagar Kekare, Milpitas, CA (US)

(73) Assignee: Synopsys, Inc., Mountain View, CA (US)

( * ) Notice: Subject to any disclaimer, the term of this patent is extended or adjusted under 35 U.S.C. 154(b) by 72 days.

(21) Appl. No.: 13/023,049

(22) Filed: Feb. 8, 2011

(65) Prior Publication Data

US 2012/0131527 A1    May 24, 2012

Related U.S. Application Data

(60) Provisional application No. 61/376,423, filed on Aug. 24, 2010.

(51) Int. Cl.
*G06F 17/50* (2006.01)

(52) U.S. Cl.
USPC .............. 716/54; 716/51; 716/106; 716/111; 716/136

(58) Field of Classification Search
USPC ................ 716/51, 52, 54, 106, 111, 132, 136
See application file for complete search history.

(56) References Cited

U.S. PATENT DOCUMENTS

| | | | | |
|---|---|---|---|---|
| 5,112,129 A * | 5/1992 | Davidson et al. | ............. | 356/497 |
| 6,581,202 B1 * | 6/2003 | Tourne et al. | .................. | 716/51 |
| 6,886,153 B1 * | 4/2005 | Bevis | .............................. | 716/51 |
| 7,207,017 B1 * | 4/2007 | Tabery et al. | .................. | 716/52 |
| 7,260,813 B2 * | 8/2007 | Du et al. | ......................... | 716/51 |
| 7,269,816 B2 * | 9/2007 | Bevis | .............................. | 716/51 |
| 7,297,453 B2 * | 11/2007 | Watson et al. | ................. | 430/30 |
| 7,415,150 B2 * | 8/2008 | Maali | ............................ | 382/151 |

OTHER PUBLICATIONS

Friedberg et al.,"Modeling Within-Die Spatial Correlation Effects for Process-Design Co-Optimization", Mar. 2005, IEEE, Proceedings of the Sixth International Symposium on Quality Electronic Design (ISQED'05), pp. 516-521.*

* cited by examiner

*Primary Examiner* — Sun Lin
(74) *Attorney, Agent, or Firm* — Fenwick & West LLP

(57) ABSTRACT

Targeted production control using multivariate analysis of design marginalities. A list of a plurality of metrology operations is accessed during production of an integrated circuit device. The list is generated from operations performed in the design of the integrated circuit device. At least one of the plurality of metrology operations is performed on the integrated circuit device. A manufacturing process of the integrated circuit device may be adjusted responsive to results of the performing.

20 Claims, 4 Drawing Sheets

400

| Location 410 | Type of Measurement 420 |
|---|---|
| X, Y (absolute) | Line width |
| ΔX, ΔY (relative) | Line separation |
| X, Y (absolute) | Single via |
| X, Y (absolute) | Electrical parameters |
| ΔX, ΔY (relative) | "T" intersection |
| ... | ... |

FIG. 4

TARGETED PRODUCTION CONTROL USING MULTIVARIATE ANALYSIS OF DESIGN MARGINALITIES

RELATED APPLICATION

This application claims priority to U.S. Provisional Application 61/376,423, filed Aug. 24, 2010, entitled "METHODS AND SYSTEMS FOR ENABLING TARGTED PRODUCTION CONTROL USING MULTIVARIATE ANALYSIS OF IC DESIGN MARGINALITIES" to Kekare, which is hereby incorporated herein by reference in its entirety.

FIELD OF INVENTION

Embodiments of the present invention relate to the field of integrated circuit design and manufacture. More specifically, embodiments of the present invention relate to systems and methods for improvements in production control using design analysis.

BACKGROUND

In general, production control during manufacturing of integrated circuits (IC) is accomplished by sampling parameter data from a small representative portion of the IC. Parameter data may include defect inspection and metrology. Although obtaining parameter data across an entire IC may ensure the performance of the IC, compiling parameter data for an entire IC is prohibitively expensive and time consuming, and is generally considered not commercially feasible. Hence, for production control purposes, a small number of locations of the IC are typically sampled for collection of parameter data. Sampling more parts of the IC may yield more accurate results at the expense of higher costs and longer test times. On the other hand, sampling fewer locations of the IC may lead to missing some defects or marginal instances that could lead to a failure in the IC.

SUMMARY OF THE INVENTION

Therefore, what is needed are systems and methods for targeted production control using multivariate analysis of design marginalities. What is additionally needed are systems and methods for targeted production control using multivariate analysis of design marginalities that identify a manageable quantity, e.g., a quantity that is testable within an acceptable testing time, of inspections that increases the probability of finding defects or marginal instances which may become defects. A further need exists for systems and methods for targeted production control using multivariate analysis of design marginalities that are compatible and complementary with existing systems and methods of integrated circuit design, manufacturing and test. Embodiments of the present invention provide these advantages.

In accordance with embodiments of the present invention, it is desirable for the designers to guide a production process. A list of sites and/or features of an integrated circuit that have an increased likelihood of being defective or to have marginal features, e.g., geometries, which may lead to longer term degraded behavior, may enable a manufacturing process of a particular device to be improved while decreasing the amount of testing necessary. For example, the output of "Analysis of Marginalities" block 180 (FIG. 1) provides such a list. Such a list is herein named a "Design Fabrication Kit," or a "Fab Kit." Whereas a Process Design Kit may be said to "guide" the design process, the novel Design Fabrication Kit guides the fabrication process, based on design information that is typically not communicated to the fabrication process under the conventional art.

Accordingly, in one embodiment, a list of a plurality of metrology sites and operations is accessed during production of an integrated circuit device. The list is generated from operations performed in the design of the integrated circuit device. At least one of the plurality of metrology operations is performed on the integrated circuit device. A manufacturing process of the integrated circuit device may be adjusted responsive to results of the performing.

In accordance with another embodiment, design information from a plurality of verification operations within an integrated circuit design process flow is accessed. An n-dimensional cross correlation of the design information is performed, and a list of correlations resulting from the cross correlation is then created.

In accordance with yet another embodiment, a Design Fabrication Kit includes a tangible computer usable media. The tangible computer usable media includes a list of a plurality of metrology operations. The list is generated from information created during the design of an integrated circuit device. The tangible computer usable media may be used for guiding computer-implemented integrated circuit test tools to perform at least one of the plurality of metrology operations.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

FIG. 4 illustrates an exemplary Design Fabrication Kit, in accordance with embodiments of the present invention.

DETAILED DESCRIPTION

Figure 1:
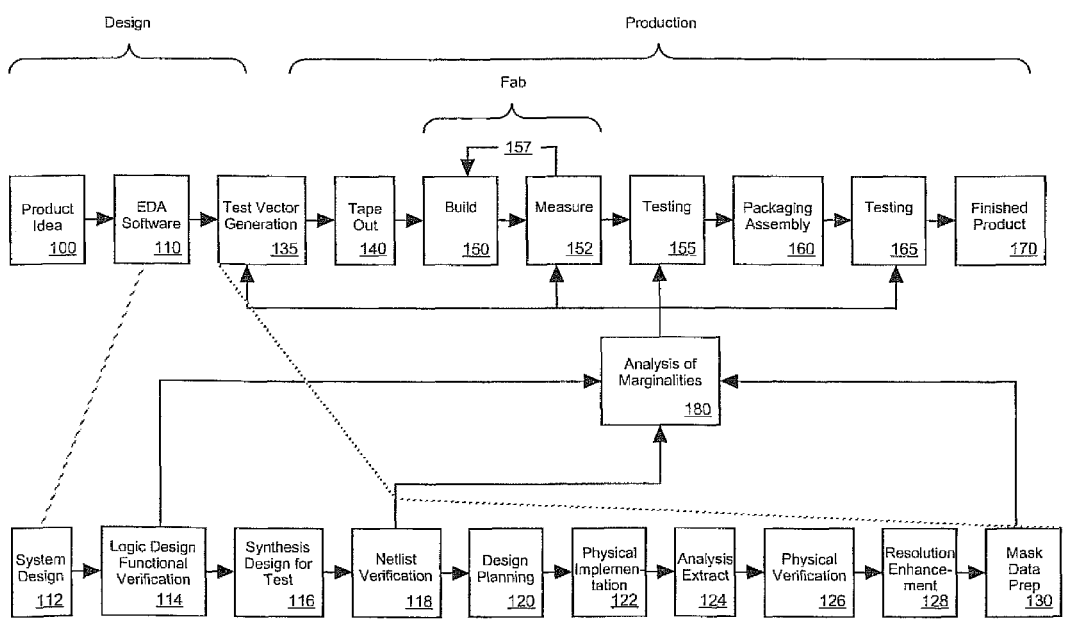
FIG. 1 illustrates exemplary stages in the design and fabrication process of an integrated circuit (IC) in accordance with the present invention.

Reference will now be made in detail to various embodiments of the invention, a reusable image bearing surface and method of modifying memory contents related to same, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow (e.g., processes 200 and 300) are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "performing" or "generating" or "adjusting" or "creating" or "executing" or "continuing" or "indexing" or "processing" or "computing" or "translating" or "calculating" or "determining" or "measuring" or "gathering" or "running" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The term "metrology" is used to refer to or to describe the science of measurement. As used in the semiconductor arts and herein, "metrology" may refer to measurement of features of a rendered or partially rendered integrated circuit device. Such features may be static features, e.g., layout geometry features, contaminant defect count, and/or dynamic features, e.g., timing, resistance, capacitance, inductance, power (static and/or dynamic) or other electrical properties arising from an energized (or simulated) circuit.

Targeted Production Control Using Multivariate
Analysis of Design Marginalities

FIG. 1 illustrates exemplary stages in the design and fabrication process of an integrated circuit (IC), in accordance with the present invention. The IC design process typically begins with a product idea or concept (operation 100) which is realized using an Electronic Design Automation (EDA) process (operation 110). Once the design is finalized, it typically transitions to the production process, beginning with tape-out (event 140), at which point it goes through a fabrication process (operations 150 and 152) and packaging and assembly processes (operation 160) to produce manufactured microchips (result 170). The production control is performed during the fabrication process (operation 150).

Test vector generation 135 may be viewed as a design operation, a production operation or as both. Generally, a design team generates test vectors, particularly based on a desired function. For example, a finished product should "pass" a set of functional test vectors to be accepted. A production team also frequency generates test vectors, both to determine functionality and also for more specialized, production-related functions.

The EDA process (operation 110) comprises operations 112-130, which are described below for illustrative purposes only and are not meant to limit the present invention. Specifically, an actual integrated circuit design may require a designer to perform the design operations in a different sequence than the sequence described below.

In the system design (operation 112) stage, the designers describe the functionality that implements the product idea. They may also perform what-if planning to refine the functionality, perform cost analysis, etc. Hardware-software architecture partitioning may occur at this stage. Exemplary EDA software products that may be used at this stage include Model Architect, Saber®, System Studio, and DesignWare®, commercially available from Synopsys, Inc. of Mountain View, Calif.

In the logic design and functional verification (operation 114) stage, the VHDL or Verilog code for modules in the system is written and the design is checked for functional accuracy. More specifically, the design is checked to ensure that it produces a correct response. Exemplary EDA software products that may be used at this stage include VCS®, Vera®, DesignWare®, Magellan™, Formality®, ESP and Leda®, commercially available from Synopsys, Inc. of Mountain View, Calif.

In the synthesis and design for test (operation 116) stage, the VHDL/Verilog source code may be translated to a netlist in this stage. The netlist may be optimized for the target technology, and tests may be designed and implemented to check the manufactured microchips. Exemplary EDA software products that may be used at this stage include Design Compiler®, Physical Compiler®, Test Compiler, Power Compiler™, FPGA Compiler, TetraMAX®, and DesignWare®, commercially available from Mountain View, Synopsys, Inc. of California.

In the netlist verification (operation 118) stage, the netlist is checked for compliance with timing constraints and for correspondence with the VHDL/Verilog source code. Exemplary EDA software products that may be used at this stage include Formality®, Primetime®, and VCS®, commercially available from Synopsys, Inc. of Mountain View, Calif.

In the design planning (operation 120) stage, an overall floorplan for the microchip is constructed and analyzed for timing and top-level routing. Exemplary EDA software products that may be used at this stage include Astro™ and IC Compiler products, commercially available from Synopsys, Inc. of Mountain View, Calif.

In the physical implementation (operation 122) stage, the placement (positioning of circuit elements) and routing (placement of interconnections) occur at this stage. Exemplary EDA software products that may be used at this stage include Astro™ and IC Compiler products, commercially available from Synopsys, Inc. of Mountain View, Calif.

In the analysis and extraction (operation 124) stage, the circuit function is verified at a transistor level; this, in turn, permits what-if refinement. Exemplary EDA software products that may be used at this stage include AstroRail™, PrimeRail, PrimeTime®, and Star-RC™, commercially available from Synopsys, Inc. of Mountain View, Calif.

In the physical verification (operation 126) stage, the design is checked to ensure correctness for manufacturing, electrical issues, lithographic issues, and circuitry. Hercules™, commercially available from Synopsys, Inc. of Mountain View, Calif., is an exemplary EDA software product that may be used at this stage.

In the resolution enhancement (operation 128) stage, geometric manipulations of the layout are made to improve manufacturability of the design. Exemplary EDA software products that may be used at this stage include Proteus/Progen, ProteusAF, and PSMGen, commercially available from Synopsys, Inc. of Mountain View, Calif.

In the mask data preparation (operation 130) stage, "tape-out" data for production of masks is provided to produce finished integrated circuits, e.g., "chips." Exemplary EDA software products that may be used at this stage include the CATS® family of products, commercially available from Synopsys, Inc. of Mountain View, Calif.

In general, there may be pre-package testing (155), e.g., wafer- or die-level testing, and/or post-package testing (165) of an integrated circuit device.

In general, a fabrication operation may be thought of as a series of build operations (150) followed by a measurement operation (152). For example, a layer may be laid down on a wafer, and aspects of that layer are inspected and/or measured. Measurement operations 152 may include production control operations performed during fabrication, e.g., metrology, defect inspection or other forms of inspection. Measurement operations 152 may result in feedback 157, e.g., adjustments, to the build process 150. Such adjustments may be in place for a subsequent operation on a present device, or for a recent operation on a future device.

As used by those of skill in the integrated design arts and in the present application, the term "marginalities" is used to describe or refer to aspects of a design, e.g., timing of a particular net, that are close to, but do not violate a design or production requirement. For example, if a signal transition is required to occur within 100 ns by design, and simulation predicts the transition will occur in 99 ns, that particular circuit may be characterized as "marginal," or as comprising a "marginality." It is to be appreciated that marginalities may represent logical elements, e.g., cells or nets, static features, e.g., layout geometry features, and/or dynamic features, e.g., timing or other electrical properties arising from an energized (or simulated) circuit. It is to be further appreciated that what constitutes a marginality may be subjective, and may vary within a design and from design to design. Still further, marginalities may be specified, measured, graded and/or prioritized in various ways, including in absolute or relative terms.

Each verification process (e.g., 114, 118 and 126) is associated with determining different types of marginalities in a design. In accordance with the conventional art, this marginality information is generally discarded, e.g., meeting the design requirement is considered sufficient, or utilized by designers within the "design cycle" to improve the design. For example, any use of marginality information stays within the design process, e.g., within the processes of EDA software block 110.

In accordance with embodiments of the present invention, the information about marginalities of various locations on the IC as obtained from a plurality of verification processes may be useful in selecting types of measurements and/or regions of a rendered device for sampling parametric data.

Referring once again to FIG. 1, information of design marginalities is provided to "Analysis of Marginalities" 180, in accordance with embodiments of the present invention. In addition, information of the physical design is provided to 180, e.g., from resolution enhancement 128 and mask data prep 130. After processing, a list of sites and/or types of measurements is provided to test vector generation 135, measurement operation 152, testing 155 and/or 165. "Analysis of Marginalities" 180 may also provide feedback to test vector generation 135. The list may be prioritized. For example, a prioritized list may rank sites by a degree of correlation of design marginality to physical feature. The sites so identified may be more likely to be defective or to have marginal features, e.g., geometries, which may lead to longer term degraded behavior.

In this novel manner, manufacturing test may be guided to inspect regions with increased probability of finding defects or marginal instances which may become defects. As a beneficial consequence, the number of inspections may be decreased, while the probability of finding defects or marginal instances which may become defects may be increased, in comparison with the conventional art. As a further benefit, the production process for a particular design may be improved based on such inspections.

Figure 2:
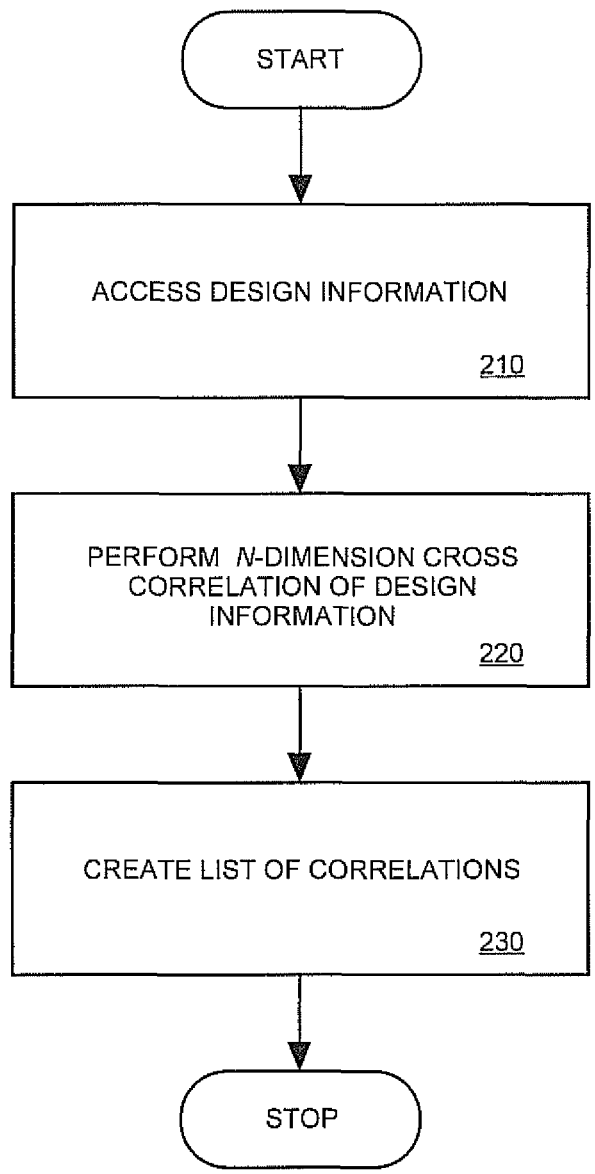
FIG. 2 illustrates a computer-implemented method of analyzing marginalities, in accordance with embodiments of the present invention.

FIG. 2 illustrates a computer-implemented method 200 of analyzing marginalities, in accordance with embodiments of the present invention. Method 200 generally corresponds to the operations of 180 (FIG. 1). In 210, design information is accessed, e.g., from a plurality of verification operations within an integrated circuit design process flow. For example, design information may be accessed from logic design and functional verification 114, netlist verification 118 and/or physical verification 126 (FIG. 1).

In 220, an n-dimensional cross correlation of design information obtained in 210 is performed. Each dimension corresponds to the sources of information available from the various design stages.

Table 1, below, illustrates some exemplary data types that may be utilized in a cross correlation, in accordance with embodiments of the present invention. It is to be appreciated that embodiments in accordance with the present invention are well suited to the inclusion other data types as an axis in a cross correlation.

TABLE 1

| Data (axis) | Relevance |
| --- | --- |
| Physical Design | Access to the physical location of each polygon that constructs every net as well as the placement of every cell in a given design |
| Layout | Access to the layout information broken down into shapes and mask layers, pre and post preparations for mask making |
| Static Timing Analysis | Access to the available slack on each net in the design |
| Dynamic Power | Access to simulated active (switching) power consumption information about every net in given design, under given test conditions |
| Static Power | Access to simulated static (leakage) power consumption information about every net in given design, under given test conditions |
| Parasitic Extraction | Access to the simulated R and C values for each metal component of all the nets in a given design |
| DFM Check or Hotspot Analysis | Access to marginal geometries or areas within a given design based on simulation of litho, CMP or defect characteristics of a fab |
| Design Rules Check (DRC) Logic Rules Check (LRC) Mask Rules Check (MRC) | Access to any information containing physical verification violation flags, or recommended rule violation flags |
| TCAD or SPICE simulation | Access to transistor or standard cell electrical characteristics based on complete TCAD or SPICE simulations |
| Strain engineering | Access to Strain engineering constraints, e.g., strained Silicon |

An n-dimensional cross correlation of a plurality of such axes may be obtained via well-known multivariate analysis, including, for example, principal component analysis, correspondence analysis, geometric data analysis, combinatorial data analysis, and/or factor analysis to determine which combinations are related.

In 230, a list of correlations resulting from the cross correlation is created. The list identifies physical locations correlated with design marginalities. The list may be prioritized.

For example, the cross correlation may identify a high incidence of "tight" or marginal timing on nets with a single via. The list may specify the physical location of single vias on such critical nets. In accordance with an embodiment of the present invention, the physical location may be specified in a manner compatible with the Graphic Data System (GDS).

In general, the list may specify what to measure, e.g., line width, line spacing, contact hole size, metal density and/or thickness, defect inspection, e.g., fall-on particles, and where to perform the measurement, e.g., in absolute measurements or with reference to possible alignment structures. The list may also specify non-contact measurements, e.g., non-contact, in-line electrical monitoring and characterization measurements.

Figure 3:
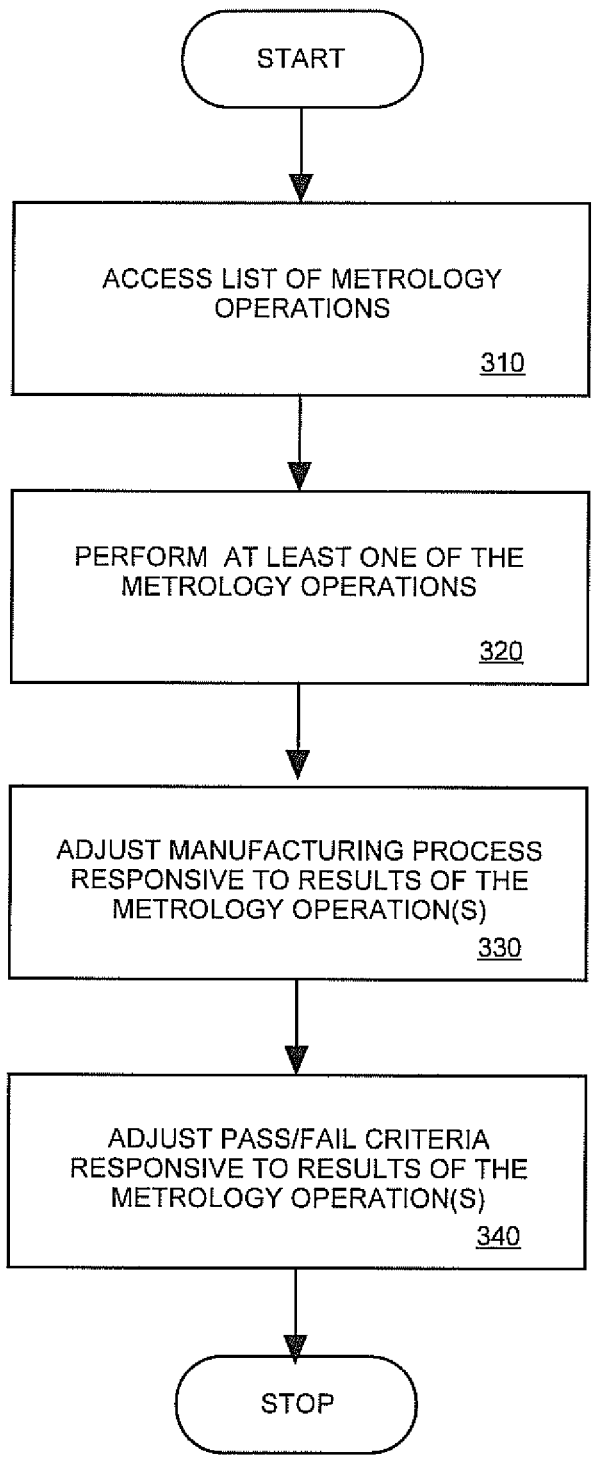
FIG. 3 illustrates a computer-implemented method of manufacturing an integrated circuit device, in accordance with embodiments of the present invention.

FIG. 3 illustrates a computer-implemented method 300 of manufacturing an integrated circuit device, in accordance with embodiments of the present invention. In 310, a list of a plurality of metrology operations, e.g., as produced by method 200 (FIG. 2), is accessed. The list of metrology operations is generated from operations performed in the design of the integrated circuit device.

In 320, at least one of the plurality of metrology operations is performed on the integrated circuit device. In optional 330, a manufacturing process of the integrated circuit device is adjusted responsive to results of the metrology operation(s). In optional 340, a pass/fail criteria for the output of the metrology operation(s) is changed, responsive to results of the metrology operation(s).

A "Process Design Kit," also called a "Process Access Kit," or "Process Kit," is a set of data files used within the semiconductor industry to model transistors and other structure for a particular process technology for a particular foundry. Such "kits" are well known in the industry. A Process Design Kit describes the essence of material and process information. For instance, the kit may contain parameters such as layer thicknesses, Young's modulus, Poisson's ratio, and stress gradient that have been well defined within the tolerances of the specific manufacturing process. A Process Design Kit typically includes standard cell libraries, design rules, SPICE models for devices and layout information. The kit automatically provides these constraints to EDA software, e.g., within 110 (FIG. 1), used by the designer in order to produce designs that are compatible with the particular manufacturing process. In summary, a Process Design Kit may be said to "guide" the design process.

In accordance with embodiments of the present invention, it is desirable for the designers to guide the production process in a complementary manner. A list of sites and/or features of an integrated circuit that have an increased likelihood of being defective or to have marginal features, e.g., geometries, which may lead to longer term degraded behavior, may enable a manufacturing process of a particular device to be improved while decreasing the amount of testing necessary. For example, the output of "Analysis of Marginalities" block 180 (FIG. 1) provides such a list. Such a list is herein named a "Design Fabrication Kit," or a "Fab Kit." Whereas a Process Design Kit may be said to "guide" the design process, the novel Design Fabrication Kit guides the fabrication process, based on design information that is typically not communicated to the fabrication process under the conventional art.

FIG. 4 illustrates an exemplary Design Fabrication Kit 400, in accordance with embodiments of the present invention. Design Fabrication Kit comprises a list of a plurality of metrology operations. The list is generated from operations performed in the design of an integrated circuit device. The list is for guiding computer-implemented integrated circuit test tools to perform at least one of said plurality of metrology operations.

Design Fabrication Kit 400 may be resident in computer usable memory or other tangible computer useable media and comprises location information 410. The location information may be absolute or relative to a physical feature of the integrated circuit, e.g., metrology targets and/or design features that are characterized as easy to locate. Location information 410 may be in a format compatible with the Graphic Data System.

Design Fabrication Kit 400 also comprises type of measurement information 420. Type of measurement may instruct computer controlled integrated circuit test machines to perform any type of test that such machines are capable of performing, at the corresponding location as given by location information 410.

In one embodiment, results from the verification processes are collected. Then, the results are processed into aggregate lists of marginalities associated with logical and/or physical elements of the IC design. Blocks or regions of the IC design are then prioritized based on a severity score obtained from the verification processes (if available). The severity score represents, for example, available slack in the design or Logic Rules Check (LRC) score.

Based on the prioritization, the blocks or regions are classified into various groups defined either by logical constructs (e.g., sub-net fanning out from a driver) or by the physical shape (e.g., fuzzy pattern groups).

In one embodiment, the collection of marginalities obtained from the verification processes are processed into potential failures that may be encountered in the ICs. Based on the potential failures, a list of production control methods may be generated for each of the marginalities associated with the potential failure. The production control methods may include, but are not limited to, in-line defect inspection, critical dimension measurement, shape quality check, and film thickness measurements. Priority may be assigned to the production control methods.

In one embodiment, the information about the marginalities is formatted into a data file that is readable by one or more equipments used in the process control. The one or more equipments may include, but are not limited to, reticle and wafer inspection tools, reticle and wafer critical dimension measurement tools, reticle and wafer film thickness measurement tools, and wafer overlay measurement tools.

In one embodiment, the list of potential failures as indicated in the results of the verification processes is used to create test patterns that are specifically targeting the failure mechanisms by applying stimulus and capturing the response of the testing equipments.

Embodiments in accordance with the present invention provide systems and methods for targeted production control using multivariate analysis of design marginalities. Embodiments in accordance with the present invention also provide for systems and methods for targeted production control using multivariate analysis of design marginalities that identify a manageable quantity, e.g., a quantity that is testable within an acceptable testing time, of inspections that increases the probability of finding defects or marginal instances which may become defects. Further, embodiments in accordance with the present invention provide for systems and methods for targeted production control using multivariate analysis of design marginalities that are compatible and complementary with existing systems and methods of integrated circuit design, manufacturing and test.

Various embodiments of the invention are thus described. While the present invention has been described in particular embodiments, it should be appreciated that the invention should not be construed as limited by such embodiments, but rather construed according to the below claims.

What is claimed is:

1. A method comprising:
    accessing, by a computer system, design information from a plurality of verification operations within a design process flow of an integrated circuit device;
    performing, by the computer system, an n-dimensional cross correlation of the design information;
    generating, by the computer system, a list of a plurality of metrology operations based on the n-dimensional cross correlation; and
    performing, by the computer system during production of the integrated circuit device, at least one of the plurality of metrology operations on the integrated circuit device.

2. The method of claim 1 further comprising:
    adjusting a manufacturing process of the integrated circuit device responsive to results obtained from performing the at least one of the plurality of metrology operations.

3. The method of claim 1 wherein the list is prioritized.

4. The method of claim 1 further comprising:
    adjusting pass/fail criteria for an output of the at least one of the plurality of metrology operations responsive to results obtained from the performance of the at least one of the plurality of metrology operations.

5. The method of claim 1 wherein said metrology operations comprise a netlist verification of a design for said integrated circuit device.

6. The method of claim 1 wherein the metrology operations comprise a physical verification of a design for integrated circuit device.

7. The method of claim 1 wherein a metrology operation included in the list comprises a location indication for a measurement and a type of the measurement to perform.

8. The method of claim 1 wherein the n-dimensional cross correlation is performed using a principal component analysis, a correspondence analysis, a geometric data analysis, a combinatorial data analysis, or a factor analysis.

9. A method comprising:
    accessing, by a computer system, design information from a plurality of verification operations within a design process flow of an integrated circuit device;
    performing, by the computer system, an n-dimensional cross correlation of the design information; and
    creating, by the computer system, a list of correlations resulting from the n-dimensional cross correlation.

10. The method of claim 9 wherein the list is prioritized.

11. The method of claim 10 wherein the list is prioritized based on a degree of correlation of design marginality to physical feature characteristics.

12. The method of claim 9 wherein at least a portion of the design information is obtained from a logic design functional verification of a design for the integrated circuit device.

13. The method of claim 9 wherein at least a portion of the design information is obtained from a netlist verification of a design for said integrated circuit device.

14. The method of claim 9 wherein at least a portion of the design information is obtained from a physical verification of a design for the integrated circuit device.

15. The method of claim 9 wherein a correlation included in the list comprises a location indication for a measurement and a type of the measurement to perform.

16. The method of claim 9 wherein the n-dimensional cross correlation is performed using a principal component analysis, a correspondence analysis, a geometric data analysis, a combinatorial data analysis, a or factor analysis.

17. A design fabrication kit comprising:
    a non-transitory computer-readable storage medium comprising:
        a list of a plurality of metrology operations, wherein the list is generated from information created during a design of an integrated circuit device, the plurality of metrology operations included in the list are prioritized based on a degree of correlation of design marginality to physical feature characteristics; and
        instructions configured to guide computer-implemented integrated circuit test tools to perform at least one of the plurality of metrology operations on the integrated circuit device.

18. The design fabrication kit of claim 17 wherein a metrology operation included in the list comprises a location indication for a measurement and a type of measurement to perform.

19. The design fabrication kit of claim 18 wherein the location indication comprises a relative location based on a physical feature of the integrated circuit device.

20. The design fabrication kit of claim 18 wherein the location indication is compatible with a graphic data system.

* * * * *

UNITED STATES PATENT AND TRADEMARK OFFICE
CERTIFICATE OF CORRECTION

Page 1 of 1

PATENT NO. : 8,549,445 B2
APPLICATION NO. : 13/023049
DATED : October 1, 2013
INVENTOR(S) : Sagar A. Kekare It is certified that error appears in the above-identified patent and that said Letters Patent is hereby corrected as shown below:

In the Claims

Column 10, line 14, claim 13, delete "design for said" and insert --design for the--.
Column 10, line 24, claim 16, delete "combinatorial data analysis, a or" and insert --combinatorial data analysis, or a--.

Signed and Sealed this
Fifteenth Day of July, 2014

Michelle K. Lee
*Deputy Director of the United States Patent and Trademark Office*